United States Patent
Lamla et al.

(10) Patent No.: US 6,830,736 B1
(45) Date of Patent: Dec. 14, 2004

(54) APPARATUS FOR CARRYING OUT A HETEROGENEOUSLY CATALYZED REACTION

(75) Inventors: Oskar Lamla, Bissingen a.d. Teck (DE); Martin Schüssler, Ulm (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/662,850

(22) Filed: Sep. 15, 2000

(30) Foreign Application Priority Data

Sep. 15, 1999 (DE) .......................................... 199 44 185

(51) Int. Cl.[7] .............................. B01J 8/02; B01J 19/00
(52) U.S. Cl. ...................... 422/211; 422/170; 422/181; 422/190; 422/191; 422/193; 422/196; 422/241; 422/200; 429/17; 429/34; 429/35; 429/39; 429/40; 429/41; 429/53; 429/55; 429/56; 429/72; 429/77; 429/79; 429/82; 502/527.11; 502/527.12; 502/527.15; 502/527.18; 502/527.24; 428/166; 165/167
(58) Field of Search ................................. 422/170, 181, 422/190, 191, 193, 196, 211, 241, 200; 429/17, 34, 35, 39, 40, 41, 53, 55, 56, 72, 77, 79, 82; 502/527.11, 527.12, 527.15, 527.18, 527.24; 428/166; 165/167; 205/50; 252/519

(56) References Cited

U.S. PATENT DOCUMENTS

| | | | |
|---|---|---|---|
| 4,425,315 A | * | 1/1984 | Tsuji et al. ................. 423/446 |
| 4,526,845 A | * | 7/1985 | Reiser et al. ................. 429/41 |
| 5,209,906 A | * | 5/1993 | Watkins et al. ............. 422/200 |
| 5,397,545 A | * | 3/1995 | Balling et al. .............. 422/171 |
| 5,456,889 A | * | 10/1995 | Pow et al. ................ 422/173.1 |
| 5,534,328 A | | 7/1996 | Ashmead et al. ........... 428/166 |
| 5,723,074 A | * | 3/1998 | Balachandran et al. ..... 252/519 |
| 5,829,517 A | | 11/1998 | Schmid et al. .............. 165/167 |
| 6,132,895 A | * | 10/2000 | Pratt et al. ..................... 429/39 |
| 6,168,703 B1 | * | 1/2001 | Lee et al. ....................... 205/50 |
| 6,200,696 B1 | * | 3/2001 | Farooque et al. ............. 429/17 |
| 2002/0012827 A1 | * | 1/2002 | Mizuno et al. ............... 429/34 |

FOREIGN PATENT DOCUMENTS

| | | | | |
|---|---|---|---|---|
| DE | 19654361 A1 | * | 12/1996 | ........... C25D/11/02 |
| DE | 197 08 472 | | 9/1998 | |
| DE | 197 53 720 | | 6/1999 | |
| DE | 198 25 102 | | 12/1999 | |
| EP | 0 217 532 B1 | | 11/1989 | |
| EP | 0 687 648 A1 | | 12/1995 | |
| EP | 0 906 890 A1 | | 4/1999 | |

OTHER PUBLICATIONS

Partial translation DE 196 54 361, John Koytcheff Jul. 24, 2003, Translations Branch/STIC USPTO.*

* cited by examiner

*Primary Examiner*—Glenn Caldarola
*Assistant Examiner*—Alexis Wachtel
(74) *Attorney, Agent, or Firm*—Crowell & Moring LLP

(57) ABSTRACT

For carrying out a heterogeneously catalyzed reaction, such as the generation of hydrogen from hydrocarbons or alcohol, a reaction mixture comprising a hydrocarbon and water is supplied to a catalyst, which is produced by pressing at least one catalyst powder into a layer. Instead of a metallic housing, stacked layers are sealed by an edge seal, introduced into the layer or applied on the layer.

10 Claims, 2 Drawing Sheets

APPARATUS FOR CARRYING OUT A HETEROGENEOUSLY CATALYZED REACTION

BACKGROUND AND SUMMARY OF INVENTION

This application claims the priority of German patent document 199 44 185.5, filed 15 Sep. 1999, the disclosure of which is expressly incorporated by reference herein.

The present invention relates to an apparatus for carrying out a heterogeneously catalyzed reaction by supplying a suitable reaction mixture to a catalyst, as well as to a method for producing the apparatus.

An example of heterogeneously catalyzed reactions is the production of hydrogen from a hydrocarbon or alcohol, especially from methanol (i.e., methanol reforming). A reaction mixture comprising a hydrocarbon or alcohol and water is supplied to a catalyst. Further examples are the carbon monoxide depletion with release of carbon dioxide in a so-called hydrogen shift reaction; the oxidation of carbon monoxide by supplying a gas-containing carbon monoxide and a gas-containing oxygen to a catalyst; as well as the combustion of a combustible educt with addition of an oxygen-containing gas in a catalytic burner.

The recovery of hydrogen from methanol is based on the overall reaction $$CH_3OH + H_2O \longrightarrow CO_2 + 3H_2$$

For carrying out this reaction, a reaction mixture comprising a hydrocarbon and water vapor is passed along a suitable catalyst. Heat is supplied at the same time in order to produce the desired hydrogen in a 2-step or multi-step reaction. Such an apparatus for two-step methanol reforming is known from EP 0 687 648 A1. In the known apparatus, the reaction mixture is supplied to a first reactor, in which a partial conversion of the methanol occurs. After passing through the first reactor, the gas mixture, in which portions of still unreacted educt are contained, is passed into a second reactor, which is optimized for the reaction. The reactors are constructed as plate reactors or bulk reactors, in which the catalyst is provided in the form of a fill or a coating on the distributing channels. Moreover, catalysts are known in the form of coated sheet metal, nets and foams, through which the reaction mixture flows.

From EP 0 217 532 B1, a method is known for the catalytic production of hydrogen from mixtures of methanol and oxygen using a gas-permeable catalyst system, for which a hydrogen generator is provided with an upper reaction zone and a lower reaction zone. The reaction mixture of methanol and oxygen is supplied to the upper reaction zone. After flowing through the upper reaction zone, the reaction mixture is passed into the lower reaction zone, in which, due to a spontaneous initiation of the oxidation of the methanol, there is such an increase in temperature, that a partial oxidation of the methanol commences in the upper reaction zone in the presence of a copper catalyst and hydrogen is formed.

EP 0 906 890 A1 discloses an apparatus for carrying out a heterogeneously catalyzed reaction in which a suitable reaction mixture is supplied to a catalyst, which is prepared by compressing a catalyst powder into a highly compressed layer forming a molded object. The reaction mixture can be forced through the catalyst layer with a drop in pressure. In order to seal them from the surroundings, such reactors usually have a massive metal housing.

It is an object of the present invention to provide an apparatus, which is an improvement with respect to weight and costs. Furthermore, it is an object of the present invention to provide a method for manufacturing such an apparatus.

This objective is accomplished by an apparatus and by a method according to the present invention.

The integration of a seal directly on or in the edge region of a stack of pressed layers represents a solution, which is an improvement with respect to weight and costs, since previously sealing of the edges was realized usually with a massive metallic housing. In contrast, pursuant to the present invention, a stack is sealed (1) in a stacking direction by end plates, and (2) transversely to the stacking direction by an integrated edge seal.

To increase safety, a sheet can be provided that surrounds the stack gas-tight. The escape of combustion gases through small leaks in the edge seal into the surroundings is avoided. For venting purposes, one or more openings provided with a catalyst can be provided. Accordingly, emerging combustion gases are reacted completely with the oxygen of the surrounding air, so that contamination of the environment is reduced.

In an advantageous development of the present invention, the catalyst material is pressed together with a supporting structure, as a result of which the catalyst material is stabilized mechanically and/or the thermal conductivity is improved. The carrier structure advantageously is a three-dimensional network structure (i.e., matrix) which, in a further advantageous development of the present invention, is a metallic supporting structure. Copper, especially dendritic copper, for example, is used as the metal.

For the preparation of the edge seal by an increased consolidation of the catalyst material in an edge region, it is only necessary to adapt the pressing tools and molds correspondingly. The tightness can be improved by admixing additional materials in the edge region, since these materials can be selected especially with regard to their sealing function. Although a subsequent sintering step can represent an increased expense for the manufacture, this method of manufacturing is used preferably in cases in which the catalyst material is also subjected to a sintering step, so that no additional effort is required.

In relation to quality control, the selection of a material that forms an edge seal under processing conditions is disadvantageous, since the tightness is brought about only after the equipment is started up. On the other hand, however, an additional manufacturing step can be omitted as a result.

A plurality of proven methods is available for applying a material, which is impermeable to gases and temperature resistant, on the finished stack of layers. The use of a soldering foil for sealing the edge has had very good results with respect to tightness.

Other objects, advantages and novel features of the present invention will become apparent from the following detailed description of the invention when considered in conjunction with the accompanying drawings.

DETAILED DESCRIPTION OF THE DRAWINGS

Figure 1:
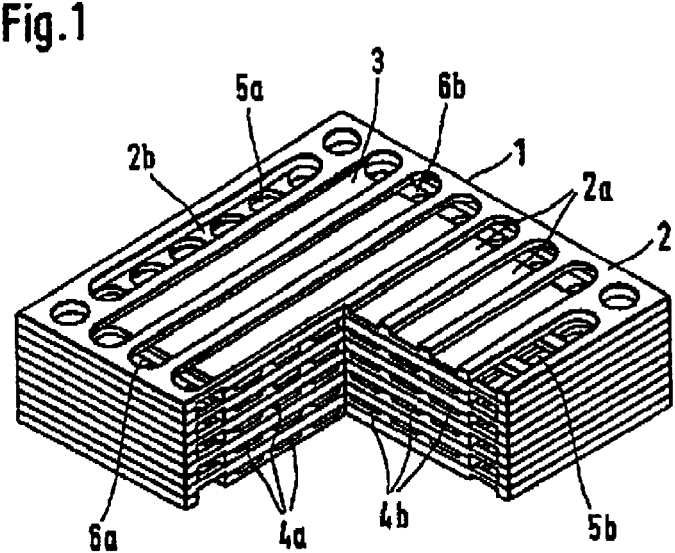
FIG. 1 in a diagrammatic representation, shows the manner in which the inventive catalyst layer functions.

FIG. 1 diagrammatically shows a side view of an inventive catalyst layer 10, which is formed by compressing catalyst material into a thin, highly compressed layer of large surface area. The layer 10 forms a molded object with a thickness d, which is, for example, 1 mm. As catalyst material, a finely grained catalyst powder or-granulate is used, the particles of which have a diameter of 0.5 mm or less. The pressing takes place at temperatures, for example, of about 200° C. to 500° C.

The catalyst layer 10, which is shown, is a component of an apparatus for producing hydrogen, the details of which are not shown. The educts of the reaction mixture, under the action of pressure, are supplied essentially perpendicularly to the catalyst layer 10 and pressed through this layer. On flowing through the catalyst layer 10, the reaction mixture experiences a pressure drop Δp of about 100 mbar and more (for example, 1 to 4 bar). On the opposite side of the catalyst layer 10, the catalytic reaction products emerge in the direction of the arrow.

An essentially gas-tight region is provided in the edge regions of the catalyst layer 10. This gas-tight region represents an edge seal 30, which ensures that the gas flows through the catalyst layer 10 only in the direction of the arrow and does not emerge laterally out of the catalyst layer 10. Due to the construction of an edge seal 30 directly in or on the catalyst layer 10, it is possible to do without a separate massive metal housing. The production of such an edge seal 30 is described in detail below.

In order to improve the mechanical stability and/or the thermal conductivity of the catalyst material, it is pressed into a support structure. This support structure is a net-like matrix, which is obtained by mixing the at least one catalyst powder with dendritic copper in powder form and compressing this mixture. During the compression, the dendritic copper powder forms a net-like matrix structure, in which the catalyst particles are "incorporated". The dendritic copper powder, even when present in a relatively small amount in proportion to the total weight of the layer, can be compressed and/or sintered easily into a network, has a large surface area, and is itself catalytically active. Therefore, by using dendritic copper powder, a stabilizing, fixing and heat-distributing network in the micrometer range is obtained.

Figure 2:
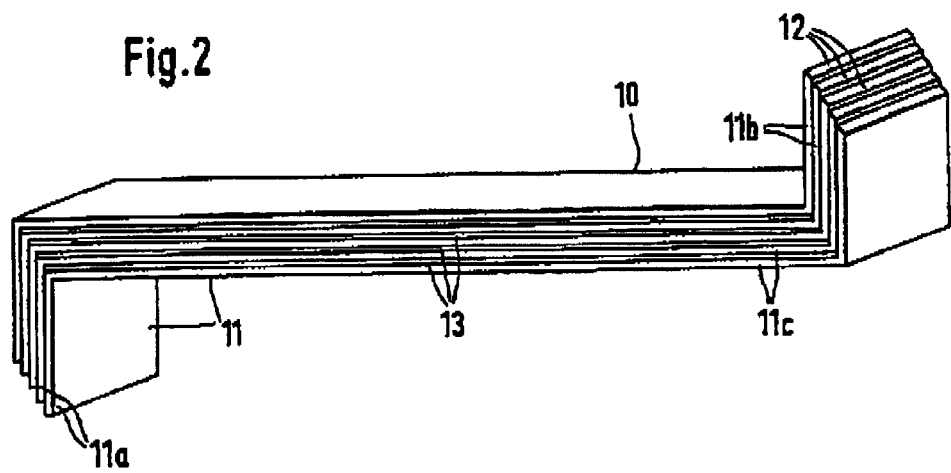
FIG. 2 in perspective representation, shows an inventive stack-shaped arrangement of catalyst layers arranged in parallel.

The catalyst layer 10 has a relatively large area of, for example, 100 cm². In order to achieve a compact construction, the catalyst volume, through which the reaction mixture flows, is divided into several layers, which are not next to one another but disposed one behind the other and parallel to one another. Such an arrangement is shown in FIG. 2 and shows a stack 20, comprising a plurality of catalyst layers 10, 10', arranged one upon the other. In order to illustrate the mode of action better, the layers at the top in the drawing are shown at a distance from one another.

At its outer periphery, extending perpendicularly to the direction of the stack, each catalyst layer 10 has an edge seal 30. In addition, the catalyst layers 10 have channels 12, 14, 14', 16 for conducting educts and products of the catalytic reaction.

In the example shown in FIG. 2, educt channels 12, extending parallel to the longitudinal edges, are provided in the catalyst layer. The educt channels 12 form conducting channels proceeding perpendicularly to the plane of the catalyst layer. The educt channels 12 of catalyst layers 10, 10', lying on top of one another, are disposed essentially congruently to one another and thus form a continuous guiding channel for the educts of the reaction mixture from the top of the stack 20 to the bottom. A specific reaction mixture, which depends on the use to which the stack arrangement is put, is passed through the educt channels 12. In the event that the stack arrangement is used as a hydrogen reactor, the reaction mixture comprises alcohol, especially methanol, as well as chemically bound hydrogen, advantageously in the form of water. In the event that the stack 20 is used in a so-called hydrogen shift reaction for decreasing the carbon monoxide content and forming carbon dioxide, the reaction mixture comprises carbon monoxide and hydrogen. In the event that the stack is used in the area of carbon monoxide oxidation, the reaction mixture comprises a carbon monoxide-containing gas as well as an oxygen-containing gas. When the stack 20 is used in a catalytic burner, the reaction mixture comprises a combustible educt as well as an oxygen-containing gas.

The educt channels 12 of each second catalyst layer 10 are connected with distribution channels 14, which extend essentially parallel to the superficial extent of the catalyst layer 10 and discharge at least a portion of the reaction mixture, which enters through the educt channels 12, into the interior of the catalyst layer 10.

After that, one part of the reaction gas mixture, entering through the educt channels 12 and passed through the stack 20, is discharged in each second layer plane through the distribution channels 14 into the interior of the two adjoining catalyst layers 10, 10', as a result of which a parallel switching of the catalyst layers, disposed one above the other, is achieved.

In the example, shown in FIG. 2, two spatially separate educt channels 12 are provided per catalyst layer 10, 10', as described. This can be used for the purpose of supplying different materials of the reaction mixture separately from one another, so that individual components of the reaction mixture come together only in the plane of the catalyst layer 10.

Figure 3:
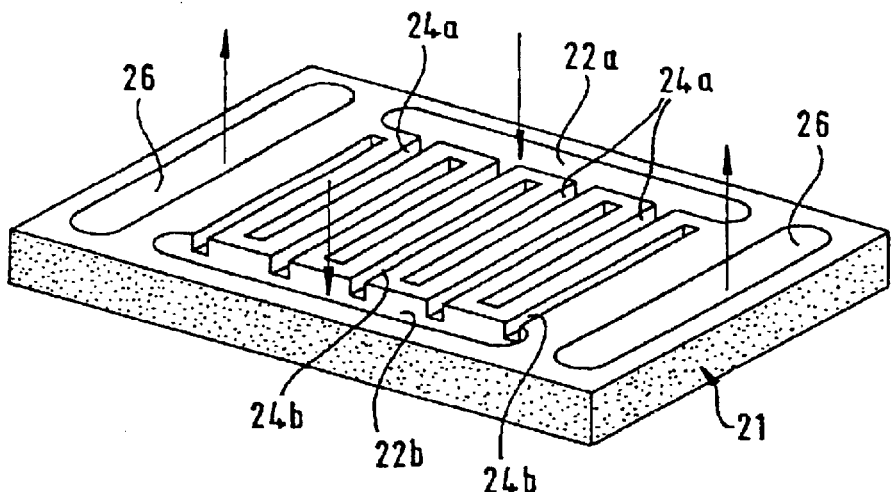
FIG. 3 shows a perspective representation of a further example of a single, inventive catalyst layer.

Advantageously, a catalyst layer with a channel structure, as shown in the example of FIG. 3, is used for this purpose. The catalyst layer 21, shown in FIG. 3, has educt channels 22a, 22b and product channels 26, which in their function, in principle, correspond to the educt and product channels 12 and 16 described in connection with FIG. 2. Deviating from the catalyst layer shown in FIG. 2, the two educt channels 22a, 22b, which are disposed spatially separated from one another, are not connected to one another by the distribution channels. Instead, the distribution channels 24a or 24b, starting out from the educt channels 22a, 22b, extend transversely over the catalyst layer 21 and end before they reach the opposite educt channel 22b or 22a. An arrangement of alternately interlocking channels is created, which can be used for supplying separately a "further" gas, which is required for the reaction or supports this reaction. If, in the example of the methanol reformer, a mixture of methanol and water is supplied through the one educt channel (for example, the educt channel 22a), oxygen (e.g., air) can be supplied through the corresponding other educt channel 22b. Over the distribution channels 24a, 24b, which are assigned to the respective educt channel, the materials supplied are distributed in the catalyst layer 21 and come into contact with one another only in the layer itself. By these means, a particularly homogeneous and safe (e.g., danger of explosion) distribution and mixing of the educts is achieved.

Embodiments, other than those shown, with only one educt channel or also with more than two educt channels, are of course also possible.

Along the transverse edges of the catalyst layers 10, 10', product channels 16, constructed analogously to the educt channels 12, are disposed and form guiding channels extending essentially perpendicularly to the superficial extent of each catalyst layer 10. In the case of superimposed catalyst layers 10, the product channels 16 are congruent with the product channels of the catalyst layers 10, 10' above and below. The product channels 16 of each second catalyst layer 10' are connected with collecting channels 14', which collect the reaction product emerging from the catalyst layers 10, 10' that are above and below and, in the transverse direction, lead to product channels 16 by which the reaction products are discharged through the stack 20.

In the embodiment shown of an inventive apparatus for carrying out a heterogeneously catalyzed reaction, such as the generation of hydrogen, the superimposed layers 10, 10' of catalyst have alternating modes of functioning. In the catalyst layers 10, the educts, supplied by the educt channels 12, are distributed over distributing channels over the surface of the catalyst layer above and below, flowing through this catalyst layer essentially perpendicularly and under an appreciable pressure drop. In the respectively following catalyst layer 10', the products of the catalytic reaction are collected in collecting channels 14' and supplied to the product channels 16 for discharging the reaction products from the stack 20.

Of course, embodiments are also conceivable, in which each catalyst layer takes over the supplying, distributing, collecting and discharging of the educts and/or products. Such more complex catalyst layers can be produced, for example, by pressing and sintering powdery catalyst material on already sintered catalyst layers.

With that, catalyst layers are made available, which can be produced in a simple and compact manner and are suitable for use in hydrogen reactors for the catalytic generation of hydrogen; hydrogen shift steps for depleting carbon monoxide; carbon monoxide oxidizers; and catalytic burners. Due to this configuration of the catalyst, a modular construction is possible, for which only slight thermal losses and no large temperature gradients occur, as a result of which a reaction that is homogeneous over a large volume can take place. The total catalyst volume can be reached spatially with educts, which leads to clearly improved starting dynamics. Moreover, the danger of ignition, of the homogeneous combustion of methanol or of the oxyhydrogen gas reaction is avoided.

By selecting suitable process parameters (e.g., compression pressure, temperature, and/or nature of the starting materials, such as particle size distribution, porosity, and the like), the expert can produce an catalyst layer or catalyst layer arrangement, which is tailor-made to meet the respective requirements and optimized with respect to the layer sequence, heat distribution, flow relationships, and mechanical properties, such as the pressure drop and stability.

The edge seal 30 can be produced in different ways. It can be formed owing to the fact that the catalyst powder, during the production of the edge region, experiences a stronger consolidation and, with that, forms an essentially gas-tight edge seal 30. Moreover, one or more other materials can be admixed with the catalyst powder in the edge region and then, in a subsequent processing step, form the essentially gas-tight edge seal 30. Preferably, materials are used that form a tight layer in a subsequent sintering step. It is, however, also possible to use materials, which are converted during process conditions and therefore, when the apparatus is started up for the first time, form the essentially gas-tight edge seal 30.

Furthermore, it is also possible to apply the edge seal 30 on the edge region after the catalyst layers 10 are pressed and stacked on top of one another. For this purpose, all materials, which are impermeable to gases and stable at elevated temperatures, can be used. Preferably, copper or a ceramic material is used. The edge seal 30 can be applied, for example, by immersion or by plasma spraying or flame spraying. It is also possible to apply a soldering foil on the finished stack, the soldering foil, under the action of heat, penetrating into the porous body and then sealing it.

The application of an edge seal 30 directly in or on the edge region of the catalyst layers 10 has the advantage that it is possible to do without the massive metal housing, which is otherwise customarily used. Thus, costs as well as the weight of the apparatus can be reduced.

Figure 4:
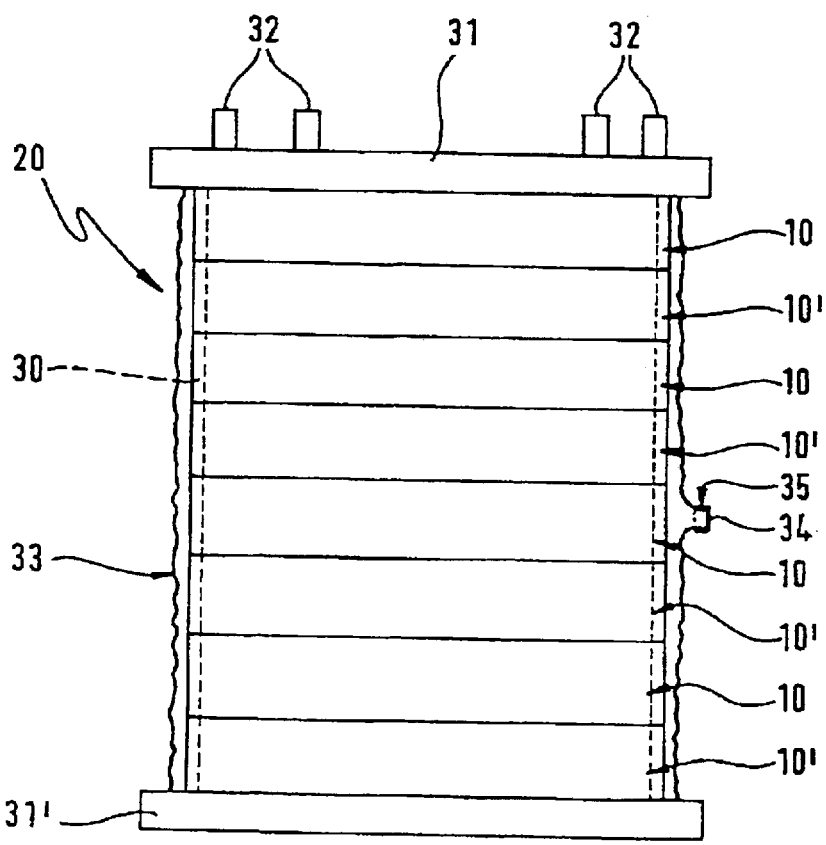
FIG. 4 shows a highly diagrammatic representation of a further example of an inventive stack-shaped arrangement of parallel catalyst layers in section.

An apparatus, optimized with regard to safety, is shown in section in FIG. 4. As in FIG. 2, a stack 20 of catalyst layers 10, 10' is provided here. This stack is disposed between two end plates 31, 31', supplying and discharging lines 32 for the media being provided in one or both end plates 31, 31'. In the example shown, four supplying or discharging lines 32 are drawn in the upper end plate 31. This is, however, only a diagrammatic representation. Of course, a different number of supplying and discharging lines 32 can also be provided. In addition, these need not all be disposed in the upper end plate 31. Instead, a portion or all of the supplying and discharging lines 32 can be provided in the lower end plate 31'.

In the edge region, all catalyst layers 10, 101 have an edge seal 30, which is only indicated by broken lines for the sake of simplicity and through which the stack 20 is sealed from the environment in a direction transverse to the direction of the stack. In the stack direction, the sealing is accomplished by end plates 31, 31'. For this reason, the catalyst layers 10, 10' must, of course, also be connected gas-tight with the end plates 31, 31'. Furthermore, the whole of the stack 20 is surrounded by a gas-tight sheet 33, which is also connected gas-tight with the two end plates 31, 31'. The sheet 33 has at least one opening 35, which is provided with an oxidation catalyst 34. Combustion gases, which have emerged from the edge seals 30 through tiny leaks that may be present, after being oxidized completely with the oxygen present in the surrounding air, can be discharged to the surroundings through this opening 35. When the apparatus is used in fuel cell systems, especially carbon monoxide, hydrogen, methanol or hydrocarbons, which are oxidized to carbon dioxide and water at a catalyst, come into consideration here. Of course, several openings 35 can also be provided. It is also possible to dispose the opening 35 in one of the end plates 31, 31'. Aside from an emission to the surroundings, a return to any place in the system is also possible. Finally, the whole of the apparatus can also be surrounded by the sheet 33, so that a seal between the sheet 33 and the end plates 31, 31' can be omitted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for carrying out a heterogeneously catalyzed reaction, comprising:
   at least one pair of alternating first and second porous catalyst layers;
   the first catalyst layer comprising
      an educt opening passing therethrough, and
      an educt channel formed in a planar surface of the first catalyst layer and fluidly connected to the educt opening; and
   the second catalyst layer comprising
      a product opening passing therethrough, and
      a product channel formed in a planar surface of the second catalyst layer and fluidly connected to the product opening; wherein
      adjacent planar surfaces of the first and second catalyst layers are in fluid communication with each other: and
   the first and second catalyst layers further comprise a substantially gas-tight edge seal in a peripheral region thereof.

2. The apparatus of claim 1, wherein the first catalyst layer comprises first and second educt openings and a plurality of educt channels fluidly connected to at least one of the first and second educt openings, and the second catalyst layer comprises first and second product openings therein and a plurality of product channels fluidly connected to at least one of the first and second product openings.

3. An apparatus for carrying out a heterogeneously catalyzed reaction, comprising:
   a stack comprising a plurality of porous catalyst layers, each of the catalyst layers comprising
   an educt opening passing therethrough,
   an educt channel formed in a planar surface of the catalyst layer and fluidly connected to the educt opening,
   a product opening therethrough, and
   a substantially gas-tight edge seal in a peripheral region of the catalyst layer;
   wherein adjacent planar surfaces of the catalyst layers are in fluid communication with each other.

4. The apparatus of claim 3, wherein the catalyst layers further comprise a product channel formed in the planar surface thereof, the fluid channel fluidly connected to the product opening.

5. The apparatus of claim 3, wherein the catalyst layers further comprise first and second educt openings, a first plurality of educt channels fluidly connected to the first educt opening, and a second plurality of educt channels fluidly connected to the second educt opening, wherein the first and second educt channels are interdigitated.

6. The apparatus of claim 3, further comprising first and second end plates, the first end plate sealingly connected to a first catalyst layer of the stack and the second end plate sealingly connected to a last catalyst layer.

7. The apparatus of claim 6 further comprising a gas-tight sheet material covering the surface of the stack between the first and second end plates.

8. The apparatus of claim 7, wherein the sheet material comprises at least one vent hole therein.

9. The apparatus of claim 3, wherein the catalyst layer further comprises a mixture comprising a metallic support structure and catalyst particles.

10. The apparatus of claim 9, wherein the metallic support structure comprises dendritic copper.

* * * * *